United States Patent
Gemayel

(10) Patent No.: US 10,225,545 B2
(45) Date of Patent: Mar. 5, 2019

(54) AUTOMATED 3D PHOTO BOOTH

(71) Applicant: IPC HK LIMITED, Sheung Wan (CN)

(72) Inventor: Simon Rizkallah Gemayel, Sheung Wan (CN)

(73) Assignee: IPC HK LMITED, Sheung Wan (HK)

( * ) Notice: Subject to any disclaimer, the term of this patent is extended or adjusted under 35 U.S.C. 154(b) by 415 days.

(21) Appl. No.: 15/127,251

(22) PCT Filed: Mar. 18, 2015

(86) PCT No.: PCT/CN2015/074429
§ 371 (c)(1),
(2) Date: Sep. 19, 2016

(87) PCT Pub. No.: WO2015/139625
PCT Pub. Date: Sep. 24, 2015

(65) Prior Publication Data
US 2018/0035096 A1    Feb. 1, 2018

Related U.S. Application Data

(60) Provisional application No. 61/968,121, filed on Mar. 20, 2014.

(51) Int. Cl.
*H04N 13/261* (2018.01)
*G03B 35/00* (2006.01)
(Continued)

(52) U.S. Cl.
CPC .......... *H04N 13/261* (2018.05); *G03B 17/53* (2013.01); *G03B 35/00* (2013.01); *G03B 35/14* (2013.01); *G03B 35/24* (2013.01); *G06F 3/12* (2013.01); *H04N 7/183* (2013.01); *H04N 13/111* (2018.05); *H04N 13/204* (2018.05); *H04N 13/275* (2018.05); *H04N 13/305* (2018.05);
(Continued)

(58) Field of Classification Search
CPC .. H04N 13/261; H04N 13/305; H04N 13/111; H04N 2213/006; H04N 7/183
USPC .......................................................... 348/61
See application file for complete search history.

(56) References Cited

U.S. PATENT DOCUMENTS

| | | | |
|---|---|---|---|
| 2011/0018981 A1* | 1/2011 | White | G02B 27/2292 348/54 |
| 2011/0234779 A1* | 9/2011 | Weisberg | G03B 17/53 348/61 |

FOREIGN PATENT DOCUMENTS

| | | |
|---|---|---|
| AU | 2012202920 A1 | 11/2012 |
| CN | 103473021 A | 12/2013 |
| JP | 2012120080 A | 6/2012 |

* cited by examiner

*Primary Examiner* — Tat C Chio
*Assistant Examiner* — Kathleen V Nguyen
(74) *Attorney, Agent, or Firm* — Kagan Binder, PLLC

(57) ABSTRACT

This fully-automated 3D photo booth uses a single-or dual-lens camera or other depth sensors. Depth algorithms process the pictures taken, which can be inserted into themed templates. A novel method of coarse segmentation separates the foreground and background. The photo booth dispenses an interlaced print and snap-in photo frame, or gives the option of viewing on a mobile device or sending via email or social media. On a mobile device, the 3D viewing is with a snap-on or adhesive optical overlay if available, using novel lenticules that solve Moiré artifacts. In the absence of an optical overlay, tilt sensors are used to move the viewpoint of the 3D scene model, to look around objects in the foreground, the same as if real objects were being tilted back and forth.

20 Claims, 9 Drawing Sheets

(51) Int. Cl.
*G03B 17/53* (2006.01)
*G03B 35/14* (2006.01)
*G03B 35/24* (2006.01)
*H04N 13/204* (2018.01)
*H04N 13/111* (2018.01)
*G06F 3/12* (2006.01)
*H04N 7/18* (2006.01)
*H04N 13/305* (2018.01)
*H04N 13/275* (2018.01)

(52) U.S. Cl.
CPC . *H04N 2213/001* (2013.01); *H04N 2213/006* (2013.01)

AUTOMATED 3D PHOTO BOOTH

PRIORITY CLAIM

This application claims benefit from International Application No. PCT/CN2015/074429, filed Mar. 18, 2015, from U.S. Provisional Patent Application No. 61/968,121, filed Mar. 20, 2014, the disclosures of which are incorporated herein by reference in their entireties.

FIELD OF THE INVENTION

The invention disclosed here concerns 3D conversions of images or video taken in a photo booth. Although photo booths go back to almost the beginning of photography, they have been limited to ordinary photo prints rather than 3D lenticular prints or 3D viewing on mobile devices. The methods used with this photo booth also allow fully-automated conversion to 3D for video or photos, both single-camera and stereoscopic.

BACKGROUND OF THE INVENTION

For photography at events, theme parks and public places, it is difficult to process personalized souvenirs quickly. It would be even better if eye-catching 3D souvenirs could be personalized and produced for visitors, but converting images or video to 3D is difficult in real-time. Adding service personnel doesn't solve the problem, if a lot of manual processing is required, because of the high labor costs. Plus, even with more people involved, the problem of creating a realistic 3D model from a two-dimensional photo is no easier.

Automatic segmentation of foreground objects in digital video is often described as an unsolved scientific problem. Biological visual systems make it seem easy. Adding supplementary data like laser range-finders or infrared patterns can improve depth perception in computer vision. But that adds additional hardware costs and complexity. For image processing with an ordinary photo or movie clip, segmenting objects depth-wise is sometimes called the Holy Grail of content conversion.

It is possible to pre-render a movie in 3D to avoid the need for real-time automatic segmentation. The movie studios have been making 3D animated cartoon movies that are not photorealistic based on 3D modeling. This is also the state-of-the-art for modern 3D computer games. However, the 3D is still locked inside a flat display screen in most cases. There is a growing resurgence of movie theaters showing 3D movies with stereoscopic glasses based on polarized or shutter lenses. It would be nice if customers could take home personalized souvenirs such as 3D pictures and video. However, until now, only big-budget movies have been able to create 3D. And even then, it is pre-processed over months or years of work.

A further problem is the need for glasses-free 3D. 3D glasses have been criticized for poor viewing. Red-blue anaglyphs cause ghosting and headaches. Polarized and shutter glasses are inconvenient and potentially expensive in large quantities for movie theaters. There are also binocular video visors, although these are not transparent and prevent interaction with others and observation of the surrounding environment.

A further problem is that sometimes it is not possible to do a lenticular print to show a 3D image or video. Laminating a lenticular lens onto an interlaced print is too time-consuming and difficult for most consumers. They would like to have instant 3D photos, but there is no obvious way to do this themselves. A mobile phone can display the imagery, but it too may not have a lenticular overlay available. It is also difficult to put an overlay on a mobile device, and to hold it in the precise location and orientation needed. A further limitation is that if the lenticular lenses are kept vertical, they usually cause Moiré Effects, magnifying the red, green or blue sub-pixels on a liquid crystal diode (LCD), light-emitting diode (LED), cathode ray tube (CRT) or other type of display screen. Yet the more they are tilted away from vertical, the less stereoscopic pop-out there is. A further problem is that most lenticular lens available is designed for printing, although the ink location has a different focal length than the pixels within a display screen.

Alternatively, a camera could be used to track the user's movements, and convert these into navigation input from the mouse or arrow keys on a computer. In this way, as the person moved, the perspective changes on-screen in a 3D scene, computer game or virtual tour. On an ordinary tablet or smartphone, you could move back and forth and see around foreground objects, like in a hologram. Unfortunately, room lighting varies dramatically for different users, which causes large variations in performance. A method is needed for when no optical overlay has been obtained for autostereoscopic viewing of a mobile display, that is more reliable than tracking from the built-in camera for viewing the "look-around effect" on each side of foreground objects on-screen.

A machine that could solve these problems would be very useful.

SUMMARY OF THE INVENTION

The invention disclosed here addresses the shortcomings in the current state of the art. The details of the method will be explained in the preferred embodiments in the next section, but are summarized here. There are several main stages of this method: the image capture, conversion to 3D, and the display and viewing of the results.

The invention begins with a novel photo booth that uses either a single lens camera or a stereoscopic camera to convert imagery (photos and/or video) into 3D. This photo booth is coin-operated with a mechanism to dispense an interlaced print and a snap-in lenticular photo frame (FIG. 1). The printer is below the seat (or in the CPU/vending compartment), releasing an interlaced print through a slot in the side.

The frames are stacked in the back wall, and dispensed by a vending machine mechanism through a slot in the side. The vending mechanism is shown in FIG. 2: a custom designed rack/stacker to hold the blank photo frames in the correct position for dispensing. At the base of each frame rack is a stepper motor which activates a push and release gate to advance the next frame into position, then push/eject it into a gravity operated stainless steel slide for the frame to slide down and land in a pick-up window where a consumer can reach in and remove the 3D frame. The stepper motors are controlled by the photo booth software and will dispense the number of frames purchased. The photo booth software has the option to upsell additional 3D photos at a discount. For example, one 3D photo for $5, two for $9, or three for $12.

It can be a permanent installation in public sites like theme parks or malls. Themes and signage are displayed with a 3D lightbox on the back exterior. Inside the booth, there is a display monitor facing the user, which could be 2D or 3D (autostereoscopic), with lights on each side. On the outside of the front wall, back to back with this monitor, there is a 3D monitor facing outward, providing a 3D pop-out display to others. The user sits on a seat in the booth to have their picture taken. They insert the payment in slots in front of them below the 2D monitor.

The photo booth can also come in a smaller portable version (FIG. 2), which stands on the floor with a printer and computer in the base below a storage cabinet and an autostereoscopic flat screen above. The portable version also has the option of being coin-operated with the mechanism to dispense the interlaced print and 3D photo frame, although it can also be operated by a retailer.

The machine disclosed here is the first fully-automated 3D photo booth. Specialized software is used to convert a photo from a single-lens camera, or that compares the images from a multiple-lens (stereoscopic) camera, to render a 3D depth map (also called a wireframe), onto which the photo is then texture-mapped. The 3D point cloud or wireframe could also be obtained by adding other distance sensors using laser range finding, infra-red patterns or other non-imaging methods, such as the Kinect sensor developed by PrimeSense from Tel Aviv, Israel, or light field cameras such as those from Lytro Inc. of Mountain View, Calif. or Pelican Imaging of Mountain View, Calif.

We can use chromakeying to remove the background of a photo by selecting a unique color like bright green in the background. As explained in the preferred embodiments, we can also convert shades of grey to different depths, and set up the photo booth with a background that intentionally contrasts with the lightness/darkness of the person being photographed. Those are indeed part of a novel overall machine here. However, the software disclosed here contains important inventive steps that are novel in themselves, and that go beyond simply being parts of a novel assembly. Anyone can set up a green screen and use common photo-editing software to manually remove the background. But these algorithms are a major differentiator, where (1) actual depths are derived rather than simple chromakeying, and (2) the algorithms are designed to operate fast enough for real time-video, and (3) are fully-automated.

For automatic conversion of dual-lens video or photos to a high quality 3D wireframe, the method disclosed here finds the basic segments by comparing two images, using a form of multi-colored edge detection from the inside and outside of the boundaries of each segment to accurately and automatically define the contour. This is a very useful technique, that provides surprisingly effective results automatically.

The goal of the dual-lens 3D method is to quickly identify segments of foreground objects on the basis of motion parallax, comparing the left and right images to find coarse areas of binocular disparity. This does not need to be precise. Then the software uses colors on the inside and the outside of the segment, and searches for a more precise dividing line between them. This is a useful and novel approach to computer vision, that provides surprisingly good detection of foreground objects automatically and in real time.

Once the image conversion creates a wireframe scene and the image is texture-mapped on to it, views of this photorealistic scene model are then saved in a specified number of views from around the 3D object-scene. These views can be "interlaced" into a large image with strips of each view, which is the standard interlacing method for creating images for lenticular lenses. Or, the photorealistic 3D wireframe model (based on either a photo or video) can be saved in an industry-standard 3D format such as DirectX, Open GL, OpenGL ES or VRML, for later interactive viewing in 3D by the customer.

The conversion happens automatically in real time, so the customer can then receive a print which they can insert into a frame, or by email, Bluetooth transmission on the spot or social media can receive a digital 3D model for viewing on a mobile device, television or computer. Once the original imagery has been converted to a 3D wireframe, a range of display options become possible. For lenticular prints or lenticular viewing on a display screen with a lenticular overlay (or a built-in lenticular overlay on an HDTV, also known as an "autostereoscopic display"), multiple views are interlaced and displayed.

An object of the present invention is to avoid the lamination which is ordinarily required with lenticular printing. In the method disclosed here, a lenticular overlay is snapped in place over an interlaced print in a picture frame or in a case for a mobile device. The ease of calibrating and fitting the lenticules to the interlacing is an important inventive step for the photo booth, and builds on the auto-aligning lens developed by our group (PCT/CN2006/002198).

For users without a lenticular overlay, it is also possible to allow them to have a "free-viewpoint" 3D viewing experience on an ordinary display screen such as a mobile device in their hands. When the device is tilted in any direction, the tilt sensors can indicate the amount of tilt and move the 3D photorealistic object on-screen. That way, just like holding a lenticular print, when the mobile device is moved back and forth, the user can experience the "look-around effect", seeing around one side of foreground objects or around the other side, above and below—like a hologram but with an ordinary screen; the same as if looking around an actual object being held in the hand.

Lenticular Overlays for Display Screens to Avoid Moiré

For autostereoscopic video, the method disclosed here involves a focusing method to allow clear lenticular (ridged) overlays to be used with a wide range of monitors, displays and mobile devices. Methods are also described for converting ordinary video content for viewing in this manner. Adding depth perception provides an enhanced viewing experience for movie watching—like the traditional stereoscope, but with video and without the binocular eyewear. The user can see depth pop-out, and as they move their head they may be able to look around foreground objects, during running video—all on an ordinary monitor with a low-cost lenticular overlay.

The term "lenticular" refers to lenticules, or miniature lenses. Traditionally these have been in arrays of long parallel ridges, although the same process applies equally to miniature round integral lenses or concentric fresnel lens ridges. The linear ridges are by far the most common in stereoscopic viewing. However, these have primarily been applied to static printing. There was no way to convert single-camera filmed movies for lenticular viewing before the age of digital video, image processing and 3D modeling. Traditionally, when a printed lenticular card was tilted, the optical ridges facing the viewer caused a flip or animation as the light paths moved from interlaced strips from one frame to the next. In the methods disclosed here, we extend this ability for stereoscopic viewing and the look-around effect in running video.

Traditionally, the interlaced images are printed or glued precisely onto the lenticular plastic. However, our approach is novel in snapping a lenticular overlay into a frame for either a printed photo or a mobile device case, and an adhesive screen protector format. Of course, the methods apply equally to a lenticular monitor with a permanently-attached lenticular layer.

Although we disclose tools for converting ordinary movies into 3D scene models, digital displays have much less resolution than print standards. Whereas the dots per inch for lenticular printing might be 600 dots per inch (dpi), on a standard computer monitor, current standards are only in the range of 80 pixels per inch, or up to 326 pixels per inch on some recent mobile screens. The methods outlined here are therefore designed to use lenticular overlays that are as thin as possible, with the smallest (i.e., highest pitch) ridges possible, given the very low resolution of lenticular viewing on monitors.

The 3D effect can then make a movie appear to have depth in front and behind the screen, without wearing 3D glasses. For consumers, this provides an experience like watching a hologram on an ordinary monitor or television. Why watch a flat picture on your computer or TV or handheld electronics, when you can experience a hologram? Plus, a low-cost piece of ridged vinyl can give the same effect as an expensive lenticular big-screen monitor.

Various methods have been developed for 3D viewing on monitors with shutter glasses, red-green glasses and polarized glasses to get stereoscopic depth pop-out. However, in the method disclosed here we use plastic optical overlays on any type of monitor or mobile device. Just as with printing, plastic overlays with the correct optics will produce stereoscopic depth pop-out, the "look-around effect" (i.e., parallax), or effects such as flipping the color or other characteristics of a foreground object when the viewer moves past.

The parallel ridges on the lenticular array are micro-lenses. A unique method is disclosed here for getting these to focus, on digital monitor displays. The standard method for lenticular viewing is that parallel lines of ridges are face-up, and the more distant side of the plastic is smooth. On the smooth side, an interlaced picture is either printed directly onto the plastic, or printed on paper and glued on. The focal plane of the lens is on the smooth back side of the plastic. In the method disclosed here, however, the focal distance needed to be adjusted given that display screens have a protective barrier, with the actual illuminated pixels perhaps 1 mm beyond the smooth side of the lenticular overlay, within the display substrates.

A second problem that is unique to monitors is that they use color mixing from red, green and blue sub-pixels to create the illusion of full-color displays. These sub-pixels are in columns. For stereoscopic effects, lenticular ridges need to be vertical on the screen. However, this causes distracting color lines in the images displayed, when the lenticular ridges magnify a particular column of colored sub-pixels. These distracting red, green and blue lines from the sub-pixels are sometimes called Moiré artifacts. In the method disclosed here, we use the radius of curvature on the mini-lenses to give the option of creating a blur patch in the focusing. If the blur patch is the same width as the red-green-blue subpixels, the intended color is preserved, instead of magnifying a column of distracting red, green or blue sub-pixels.

Using Tilt Sensors to View 3D on Ordinary Screens

For mobile users who don't have a lenticular case or overlay, we can also provide a 3D viewing experience by moving the 3D model as the tilt sensors respond in the mobile device. This is a convenient way to distribute a 3D experience anywhere online, so that a customer could send out their themed 3D photo from the photo booth to others via email or social media. Even if the others don't have a lenticular overlay, the tilt sensors can be used to provide a 3D viewing experience on ordinary display screens.

Two main phases are involved in this process: the initial segmentation of the movie, and then later 3D tilt viewing. Once the scene model exists for the 3D model with the viewpoint in the original real camera perspective, we will then control the camera perspective with the accelerometers, as the smart phone is tilted. There are several practical advantages of this approach:

Lenticular effects only work in one direction; typically horizontally, for stereoscopic depth. With 3D tilt viewing for mobile devices, the 3D viewing experience works in all directions.

There is no "sweet spot" this way. Having a narrow viewing area where the eyes must be placed is a major limitation in lenticular viewing.

There is also no "screen door effect", where you can see the plastic ridges interfering with the video.

There are no problems aligning plastic lenticules on the interlacing.

We can bypass all of the time, cost, distribution and quality control issues with plastic manufacturing this way.

Using alternating strips for the left and right views reduces the resolution in lenticular viewing. If there are two views, one for each eye, the resolution is halved. If there is a look-around effect with 6 frames, the resolution is only ⅙th of normal. In the method disclosed here, resolution is not reduced at all.

The end effect is like holding a small box in your hand with some objects inside. As you tilt the box, the perspective changes. Some objects are closer, and occlude others. We can move the virtual camera position the same way in the 3D scene model, based on feedback from tilt sensors in the handheld media device. Tilting is not used for navigation through a 3D space, it is used to control the location of the viewpoint.

The method disclosed here provides a unique method for converting ordinary photos or video to 3D, for a 3D viewing experience on handheld media players and smart phones that contain tilt sensors. Tilt sensors are in use on handheld devices already, although they are primarily used to adjust the orientation onscreen from landscape to portrait or vice versa, and for mobile games. It is an object of the present invention to use the accelerometers or tilt sensors to control the viewpoint in 3D video, causing motion parallax, occlusion and look-around effects to create depth perception, with a 3D scene model or while a 3D movie plays.

Further objects and advantages of the present invention will be apparent from the descriptions in the following sections wherein preferred embodiments of the invention are shown.

DETAILED DESCRIPTION OF THE INVENTION

Figure 1:
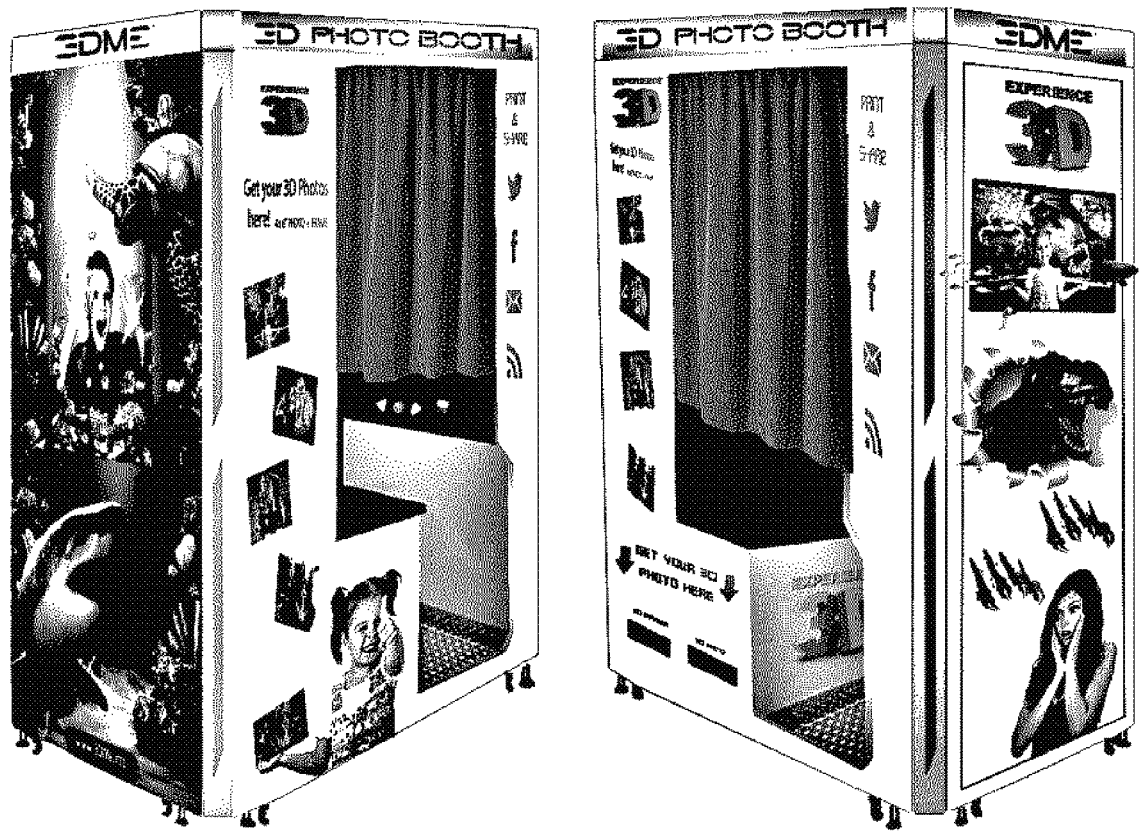
FIG. 1: Coin-operated, automated photo booth.
Figure 2:
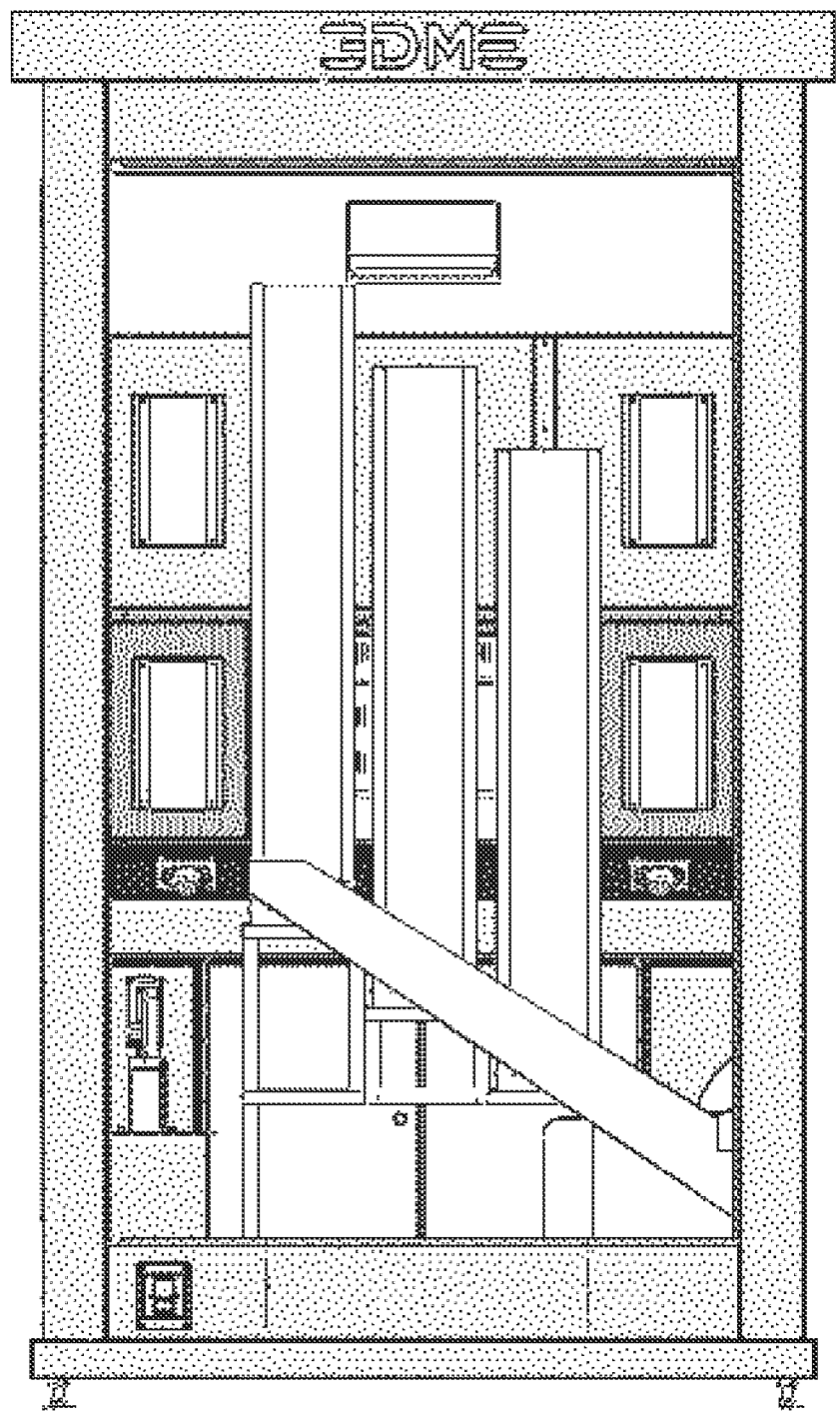
FIG. 2: Internal vending racks to dispense photo frames.

The machine disclosed here provides novel solutions to the problem of how to create a 3D viewing experience for the customer, quickly and automatically. This is the first fully-automated 3D photo booth.

In the most basic embodiment the customer goes in the booth, or is in front of the portable version. Behind them is a background or a green-screen used for chromakeying (removing that color with software). Through the methods detailed below, the software converts 2D images to 3D depths. This 3D wireframe can then be exported for any type of 3D viewing, from autostereoscopic monitors to red-green anaglyphs. In the preferred embodiment, the 3D content is viewed either in a picture frame for a print or on a display screen with a lenticular overlay for a digital photo or movie. To create the lenticular display, a series of views are saved around the 3D wireframe, and are interlaced so that there are multiple strips behind each lenticular lens.

In the preferred embodiment, when the customer is using the photo booth, they get an option to add pre-interlaced foregrounds and backgrounds to their resulting interlaced image. They can then preview the resulting 3D experience on a standard or autostereoscopic monitor. In the preferred embodiment, gesture detection with an infrared sensor from Leap Motion Inc. of San Francisco, Calif. This allows the user to scroll templates, press OK to proceed with photo capture, and select photo/back/next/print. In alternate embodiments, user interaction can be with buttons on-screen or built into the dashboard of the photo booth in alternate embodiments, or gestures tracked with the photo booth web cam.

With the user's consent, the photo booth then dispenses a 3D print and a 3D photo frame. If the resulting 3D is to be obtained digitally, it can be emailed to the customer or transferred by Bluetooth from the photo booth. The photo booth also provides an opportunity to share the 3D imagery across social networks. Although there have been vending machines and photo booths for many years, it is an overall inventive step with the machine disclosed here that it is the first to produce 3D results. A further inventive step is that it generates the 3D automatically. In other embodiments, it can also be portable or coin-operated.

Monocular and Stereoscopic Algorithms

1. Single-Camera Depth Cues

One preferred embodiment is to use the fastest, simplest methods possible in the machine, for separating the depth of the person from the background, using either chromakeying or greyscale depth mapping. In this embodiment, the booth is arranged to control the colors and background, to ensure that there is good contrast. In one embodiment this is based on color like blue- or green-screening. In another embodiment, greyscale conversion of the resulting image is used rather than color. Then, if the background was chosen to be near white or near black, it can contrast with the foreground. Then, a simple conversion of the image to greyscale in the image processing software can differentiate the foreground from the background. Segmentation can then be done, and the foreground objects and person can be placed at different depths in the scene.

In a preferred embodiment, themed templates of the background and foreground can be chosen by the user, and can optionally be pre-interlaced to move in different ways depending on depth. When the portrait photo is taken, the user is sandwiched between the foreground and background in 2D to simplify and accelerate the processing. In another embodiment, the person or persons in the portrait are also depth-mapped and interlaced for viewing in 3D.

2. Height in View

In another preferred embodiment, a simplifying assumption is used concerning the height in the image, for generating the depth information. This algorithm starts looking for foreground objects along the bottom row of the image, using the traditional visual perspective depth cue that objects in the upper part of a scene should be placed farther away than the objects in the bottom part. The higher the position of the object in a scene, the greater the depth value of the object. The "depth count algorithm" defines the coordinate of one pixel in vertical direction, and uses that value to also define depth of that point in the image. If the object continues onto lines above this point, the algorithm leaves the object at the same depth as the first pixel, and looks for other objects.

3. Automated Dual-Lens Conversion

In another preferred embodiment, rather than using a single depth cue like greyscale, chromakey or height, depths are rendered by automatically comparing the binocular disparity. For situations where it is not possible to simply convert the imagery to grey and assume that the depths are correlated, a preferred embodiment is to use a stereoscopic camera. The algorithms for this image processing from dual-lens cameras are detailed in the following section.

Conversion Methods

With stereoscopic cameras, there has been substantial research on the "correspondence problem" for matching specific points in the left and right images. However, as will be explained, we add an important inventive step for rapidly identifying coarse segments in the two scenes, before attempting to find the best matches between points in the two images. (Not the absolute matches, but just the best matches.) We add another inventive step by concentrating only on matching the edges of the segments that were identified, and trying to define the edge well from the inner and outer sides of the edge. This is a novel approach that is fast and automated, and that produces surprising, unexpected results in being able to render high-quality photorealistic 3D models automatically, either for photos or even fast enough for real-time video or for real-time video conferencing, with no need for pre-processing or keyframing, and with high accuracy.

Automated Dual-Lens Comparison

In the preferred embodiment, the first step is to compare the left and right images to find coarse segments of objects in the picture. Ordinarily this comparison needs to be perfect and is the main way of identifying the objects so that their depths can be derived using motion parallax (with greater binocular disparity indicating nearer objects). An inventive step here is that the method disclosed here only uses the dual-lens comparison to do rapid, coarse segmentation.

In the preferred embodiment, the Sum of Absolute Differences (SAD) is an algorithm that is used to compare the left and right images. Those skilled in the art will know that this is a standard method for comparing small sets of pixels in the left and right images, to find the best match between the left and right views. It is important to only look for the best match and not the exact match, because if the color is shifted between the two views, there won't be an exact match. Only a coarse mask needs to be used, because we don't need to get the exact edges at this point. The purpose is only to identify all of the colors in the foreground segments, and other sets of colors in background segments.

Ordinarily, camera movement is a huge problem in automatic 3D rendering. It usually needs to be accounted for in terms of optic flow, to then determine any additional motion parallax. But with dual-lens video (or photos), this is not necessary.

Outside-Inside Color Search

In the preferred embodiment, once the foreground and background segments have been identified by looking for best matches between the two images, we can then add depth values (the Z coordinate) and find the edges. Although chromakeying and magic wands are often used for knocking out segments from backgrounds, there are many situations where there are patterns or mottled segments, with multiple colors. Therefore, this algorithm searches for all the colors in the segment, along the boundary from the inside out. Similarly, the algorithm tabulates the colors outside of the segment and searches for where they end along the boundary, from the outside in. This saves processing time because the entire image does not need to be searched; only the boundaries of each segment. The dividing line between the external and internal colors is where the edge should be. This also has the novel benefit of finding an edge even if there is no chromakeying possible because there are multiple patterned colors in the segment and the surrounding area.

Rendering

The original images are flat and two-dimensional with X and Y coordinates, although the goal is to add the third depth dimension (the Z axis) to that. Once we have the segments, in the preferred embodiment we decide on how much resolution is desired for the 3D modeling, and convert the points into polygons. The method of joining the point cloud into vertices to render a wireframe needs to take into consideration the 3D rendering engine that will be used on viewing devices. DirectX or OpenGL are the industry standards, but join the vertices in opposite directions of rotation.

In the preferred embodiment, we use triangles as polygons, since they are always perfectly flat. It is the same as a stool with 3 legs; they are always on the flat floor. But if you use a stool with 4 legs, one of them may not be on the same plane (which could cause the software to crash, in the case of polygons in a wireframe).

To construct the wire mesh out of triangles, the algorithm begins at the bottom of the left edge of the object (point 1 in FIG. 1). In the simplest case, there are 3 sets of points defining the shape on one side: XYZ for the left edge (point 1), XYZ for the center (point 2) and XYZ for the right edge of the segment or object (point 3). Beginning with the bottom row of pixels, we put a triangle between vertices 1, 2 and 4. This is repeated up the column to the top of the object, first with the lower triangles (1-2-4, 4-5-7 . . . ) and then back down with the upper triangles (8-7-5, 5-4-2 . . . ). Then, the same method is used going up and down the right column. Knowing that there are 3 (or any number of) points across the object, the numbering of each of the corners of the triangle can then be automated, both for the definition of the triangles and also for the texture-mapping of the image onto the triangles. We define the lower left coordinate to be 1, the middle to be 2, and the right to be 3, and then continue numbering higher on each higher row.

The method here for rendering the wireframe mesh is consistent with the VRML 2.0 specification. Once the structure exists, the original photo can be texture-mapped (stretched and glued) onto it. In the preferred embodiment, the texture mapping of the photo is done as per the 3D specification in the rendering engines for display screens such as DirectX or OpenGL. However, in an alternate embodiment, the XY points in the image can be matched up with the same points in the wireframe (which also includes Z), to map the image onto the wireframe.

Embossing

In the preferred embodiment, once the image has been segmented, an algorithm is used for quickly adding some realism and shape, so that they are not simply flat layers set in Z depths. A premise of this approach is that the results will be photorealistic, and the images will enhance the perceived realism and detail, even though we want to keep the wireframe simple to minimize computation. This embodiment uses embossing, where the edges are rounded back to make foreground objects look thicker and more three-dimensional. Once the outer edge is defined, an inner contour is added. In the preferred embodiment, the inner contour is 6 pixels inside, and the inner contour is moved 6 Z-units closer. This basic procedure makes a 45-degree angle on the outer edge of the object, but you can adjust the angle and add more layers to make it rounder if needed, without departing from the spirit and scope of the invention.

Preprocessing Video by Marking Red Dots in Keyframes

In alternate embodiment, if pre-processing is desired to create more accuracy, keyframing (or "rotoscoping") can be used to allow manual specification to match the wireframe to objects in the images. Then, in-between the keyframes, the wireframe interpolates automatically. If there is a keyframe every Xth frame, the in-between frames move the vertices from the point in the first to the second frame, 1/Xth of the way on each intervening frame. It is also possible not to set keyframes on regular intervals, but to use dynamic keyframes, only when a scene changes.

This method also allows more precise depth information to be entered for each object. In motion analysis alone, although a foreground object may be segmented, additional information is needed to know whether it is a large object far away or a small object up close. The method outlined here therefore uses manual verification of segmentation and depths on the Z-axis, interpolating between keyframes.

The 2D-3D conversion process is embodied in a software program that follows the following steps:

1. An ordinary two-dimensional movie is opened with the software. The number of frames in the movie and frames per second are determined by the software using standard data available in the movie format. The user can then enter the desired keyframe spacing (although they can also add frames at other intervals for dynamic keyframing if there is no movement in a long scene or if there is a scene change).
2. The program saves frames as separate bitmap images from every Xth frame (keyframe).
3. The program displays the first keyframe with picture editing tools. Although a variety of line-drawing, selection, masking or motion analysis tools could be available, in the present embodiment, we use the cursor to click self-connecting dots around the edges of a foreground object to be segmented. Starting at the bottom left, dots are clicked in a clockwise direction going around the edge of the foreground object.
4. When the boundary of the foreground object has been outlined, the depth of the object along the Z axis is entered in a text box. Although any scale could be used, for convenience, in the present embodiment, the Z axis defines the distance from the camera with the background at 100% distant. The X axis is defined as the lateral direction, and in the present embodiment, the Y axis is vertical. If an object is halfway to the background, it would be given a depth value of 50 in the present embodiment. In the present embodiment, object distances are measured away from the camera, although distances from the background could also be used.

Figure 3:
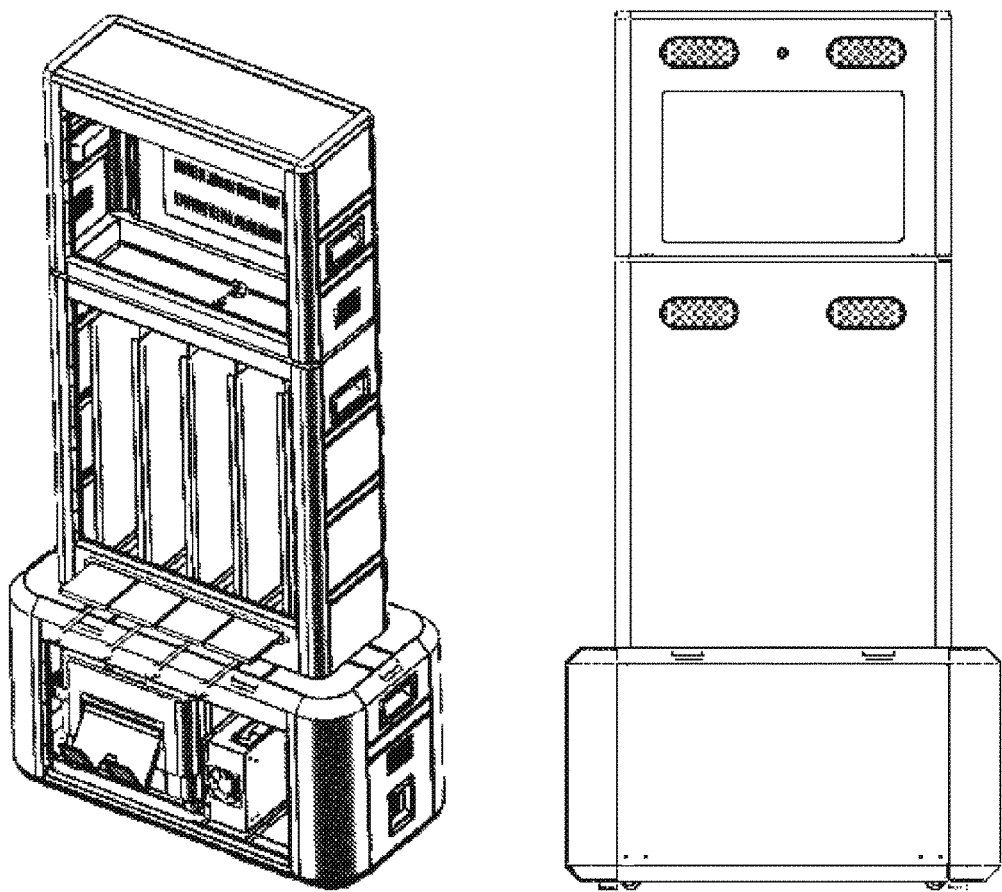
FIG. 3: Portable version of photo booth, showing open view of back (left) and the autostereoscopic monitor at the top of the front (right).

5. It would be easiest to texture map the video itself onto the wire mesh, although at present, few graphics formats support texture-mapping of video for mobile devices. We therefore either save the video for texture-mapping or texture-map a sequence of images, which can be buffered and displayed in sequence at a specified frame rate.
6. The scene model could be projected onto a variety of geometric shapes to model visual perspective. While not excluding common approaches like projecting an immersive scene model onto a ground plane or the inside of a sphere or cube, for simplicity the present embodiment begins with the visual perspective in the video and simply sets the foreground object shapes in front of a vertical background wall at Z=100.
7. Additional objects can be added or removed as they enter and exit the scene. During the keyframing, a button is used to indicate that dots are being added or stopped for a particular object that is entering or disappearing.
8. Any number of objects can be segmented in the first keyframe. Then, a Next button is pressed, to go on to the marking dots for the same objects in each subsequent keyframe.
9. When every keyframe has been segmented manually, the software gives a message indicating that this is done. The segmentation process can be done on separate scenes from a long movie and later combined into a long series of scenes. Or, a complete movie can be processed.
10. Even if keyframes are defined to frequently check on accurate segmentation of foreground objects, the dots could be moved automatically using motion analysis. In one embodiment this uses single-camera cues using the Sum of Absolute Differences method to compare earlier and later frames. Or, in an alternate embodiment, motion parallax is used based on the dual-lens conversion above.
11. Indicate the frame rate for saving image sequences and for synchronizing the wireframe movement with the movement of foreground objects in these images.
12. An interpolation button in the software interface can then be selected to generate a single data file with XYZ coordinates and a frame number for each dot clicked, as well as the number of image files based on the frames per second.
13. For frames in-between keyframes, the difference between the X, Y and Z coordinates in the previous keyframe and the next keyframe is calculated. These differences are divided by the number of intervening frames, to indicate how far X, Y and Z vertices in the wireframe should change on each frame.
14. In the preferred embodiment, this data is written in the industry standard XML, so that the data can be saved and moved from the rendering computer to a mobile device. The XML would be written for use in a standard mobile 3D graphics format such as OpenGL ES. In an alternate embodiment, rather than XML, other formats could be used that store data such as text files.
15. Region-filling: Standard methods involve stretching in the edges or cloning them to cover the blank spot behind foreground objects. An alternate embodiment is to buffer any background that is observed in a scene model independent of the foreground objects. That way even if the background is occluded to the camera, it is still visible when the viewpoint moves. The preferred embodiment with the method disclosed here is to "emboss" foreground objects by continuing their connection to the background with a soft corner and then a connecting surface. Parameters can be defined to control the sharpness of the curve, the amount of pop-out on the Z axis, and the angle of slope in surface connecting to the background. Embossing is a way to cover the blank area behind foreground objects without artificial filling-in or seams.
16. After red dots are added to outline an object in one frame, a polygon mesh is generated by joining the vertices or dots using the procedure illustrated in FIG. 3.
17. When foreground objects are moved from the background image into XYZ foreground coordinates based on distances indicated during keyframing, they are reduced in size so that they still subtend the same angle when moved closer to the viewer. In one embodiment, we can use trigonometry to calculate the correct reduction in size of foreground objects that are pulled closer in the 3D scene model. We can calculate the degrees that an object subtends in the original image. Then we want to change the size so that it subtends the exact same number of degrees when it is pulled into the foreground. Using tan=opposite/adjacent, we can calculate that the new size for the height, width or any cross section equals the distance from the camera times Tan of the degrees subtended. A right triangle is needed, so for objects in the periphery it is possible to measure distances from the center of the image (although this level of precision is usually not necessary in practice). The first step is to get Tan of the angle subtended by the object in the original movie frame, by dividing the height of the object by the distance away, based on Tan=Opposite/Adjacent. (If the view is to the middle of the object, the overall height can be halved to maintain a right angle from the camera line to the object on the background.) For the second step, we know Tan alpha and the new distance from the camera. From these, we can derive the missing variable which is the new size that subtends the same angle.

There is also an alternative embodiment that is more convenient although not as accurate. Conceptually, as the object is brought closer to the camera, it needs to get proportionately smaller to subtend the same angle. We can implement this logic quantitatively:

New Size=Original size in background×distance from camera/100

This means that if we bring the object 70% closer, that it should be reduced to 70% smaller, to subtend the same angle.
18. Then, the software automatically moves the wireframe 3D scene model from the first manual keyframe to the next, interpolating on in-between frames. A data file is written of the location of the wireframe on each frame, or keyframing is used in the later playback to move from one position at a particular time to the next.
19. In the software, a button or menu item can then be selected to look at the 3D scene model. This starts on frame 1, but can be played and paused on any later frame as well. A number of industry-standard graphics engines can be used for this 3D rendering. We can input the XYZ coordinates from the data file of wireframe vertices in each frame, using industry-standard 3D platforms such as DirectX, OpenGL, OpenGL ES or VRML. The methods disclosed here can be used with any of these standard graphic formats.
20. While viewing the 3D scene on the computer, the viewpoint can be moved (within adjustable limits) using keys such as the arrow keys or mouse, to verify what the scene will look like when viewed on a handheld media player.
21. In one embodiment, individual images are then saved from the 3D scene. The images would be saved during the export from the keyframing program, with a reduced size and frame rate suitable for the handheld device. In an alternate embodiment, it would also be possible to save a movie with a specified frame rate, for handheld devices that are able to texture-map video. We place the images or video and the XML file containing the wireframe data all in the same folder.

Displaying the 3D Output

In the preferred embodiment, once the photo booth has completed the 3D conversion, there are several options for viewing or sharing the resulting 3D viewing experience. As detailed in the subsections that follow, the results could be interlaced and printed for either a 3D frame or display screen, or they could be viewed using the tilt sensors on an ordinary mobile device. The content could be photos or video that is converted. Because these methods are designed to be fast and automated, the video could also be real-time video conferencing with 3D viewing. A further embodiment that is detailed below is adding a 3D viewing experience to augmented reality objects that are triggered from a print image or bar code. Ironically, although those are often 3D models, an inventive step here is to go beyond flat screens for viewing the 3D models, to a 3D viewing experience of the augmented reality.

Before going into the details of the display methods for using optical overlays or tilt sensors to create the 3D perception, there is an important inventive step if the 3D content is going to be viewed on with a mobile app. In the preferred embodiment, the software ("app") for the mobile device can recognize whether the device has an overlay or not, to determine the type of content to display. This is implemented with the following steps.

a.) The App is a free download.
b.) When the app is activated, it will prompt the user to enter the serial number of their screen protector. If this information is not provided, the app will work as a 2D video player.
c.) Each optical screen is sold with a unique serial number. This serial number is processed through the app registration and our back end software. The serial number can only be used once.
d.) All registered serial numbers are stored on a server. The app also searches the user's contact list to identify other users of the same app.
e.) When sharing photos and or video between devices, the sending device will know who on its contact list has the same app. If the recipient does not have the app, then the app will send 3D content, photos and video in a format which does not require viewing with an optical overlay. For 3D content, this could be sent for viewing using the tilt sensors described in section 3 below.

1. Print for 3D Photo Frame

Figure 4:
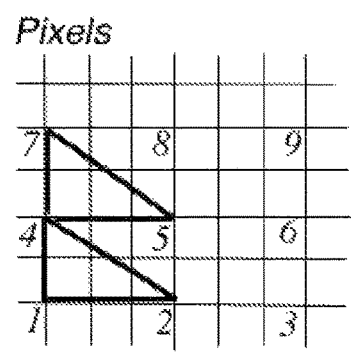
FIG. 4: Joining points into wireframe.
Figure 5:
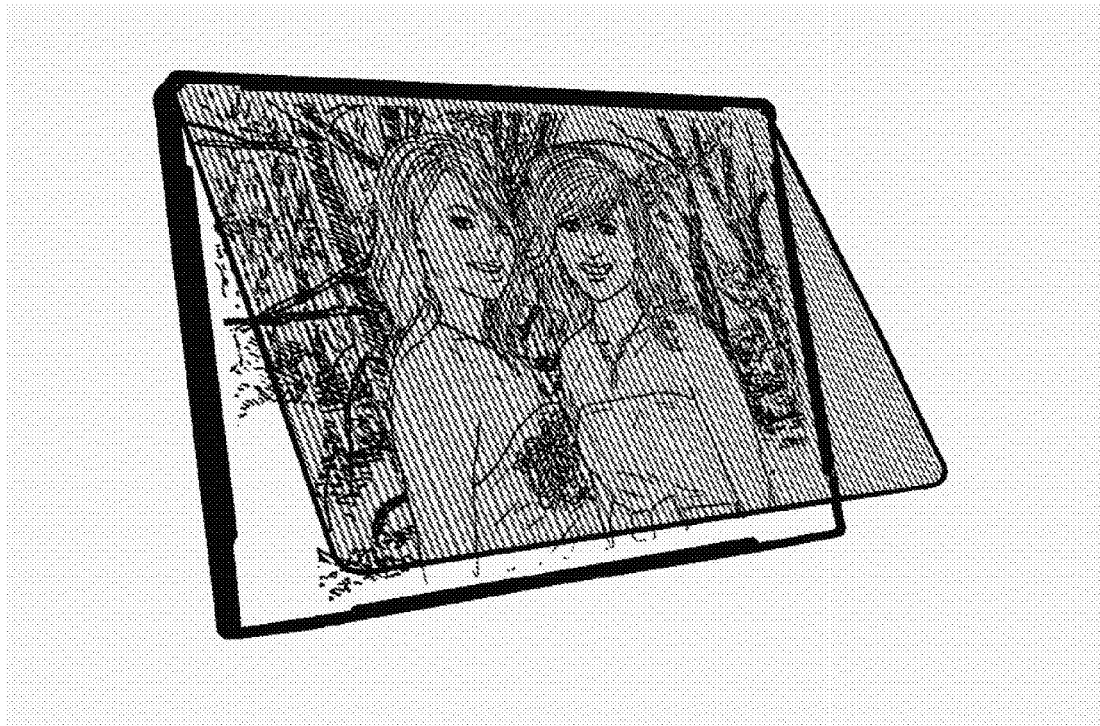
FIG. 5: Lenticular overlay for picture frame.

One preferred embodiment for viewing the 3D output is a photo frame in which the lenticular overlay snaps precisely in place over the interlaced print. The frame and lenticular overlay are made to exact tolerances for specific photo paper sizes (standard and custom). The print is inserted into the frame, and then the clear lenticular overlay snaps on over the interlaced print. As shown in FIGS. 4 and 5, there are tabs along the edges of the front, that hold the lens tightly in place. Although there have been lenticular prints for many years, they are difficult to laminate and are usually mass-produced by lithographic printing rather than as individual prints. An important inventive step with this frame is that it holds the photo paper and the lens in the correct orientation, and precisely matches the interlaced print to the lenticules with no need for adhesive or lamination. A further inventive step is the speed of simply by snapping the print and lens onto the frame.

In the preferred embodiment, there is a grid across the back of the frame, to support the print, as shown in FIG. 5. The lens and frame are also designed to be sturdy enough to ensure contact across the entire area of the photo paper and lenticular lens. This structure is therefore an important inventive step that is faster and simpler than the traditional method with a laminating machine or an expensive process of printing onto the back of the lenticular plastic.

Figure 6:
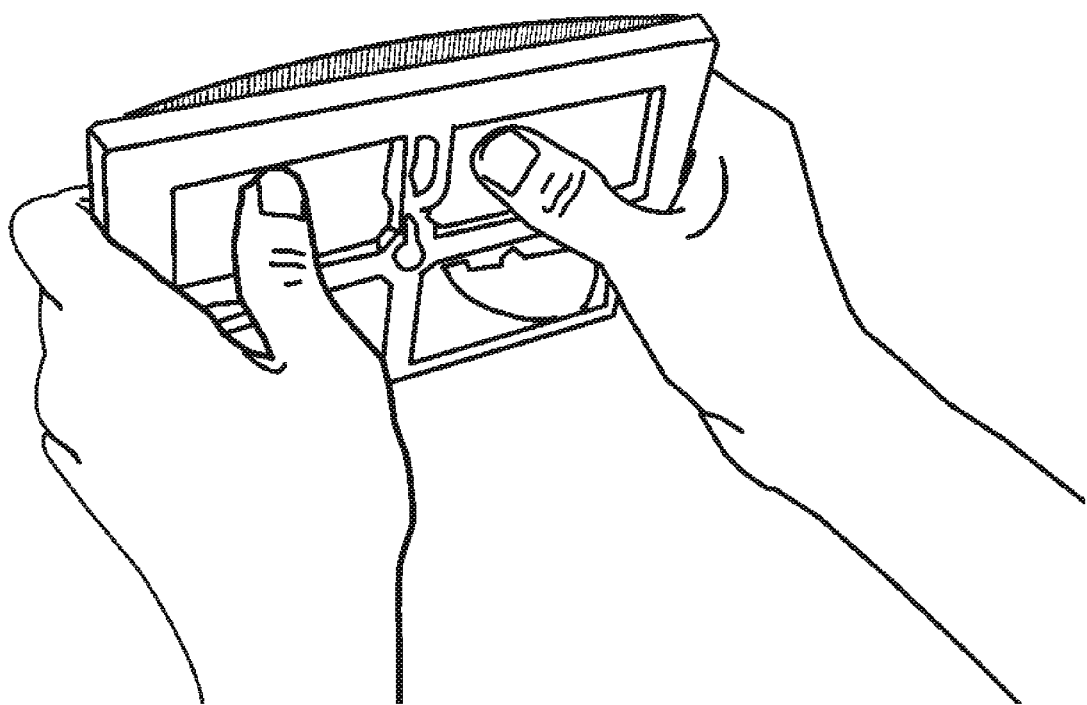
FIG. 6: Snapping lenticular overlay into frame.
Figure 7:
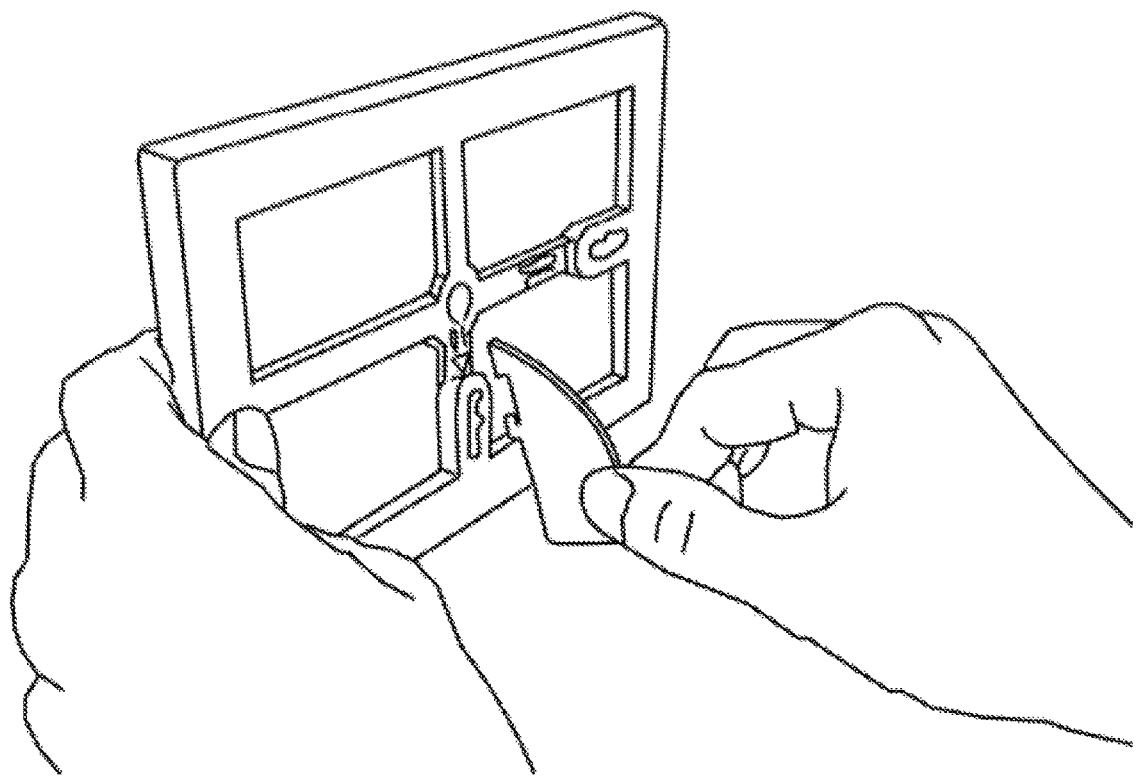
FIG. 7: Stand on back of picture frame.

As shown in FIG. 6, the back of the frame also contains slots for wall hanging, and an innovative tab that can be detached to use as a support leg.

In another preferred embodiment, LED backlighting is used with the print. The light is built-into a light box which includes the optical lens, with the light located behind the print.

2. Mobile Overlay

Lens Designed for Screen Overlay

Figure 8:
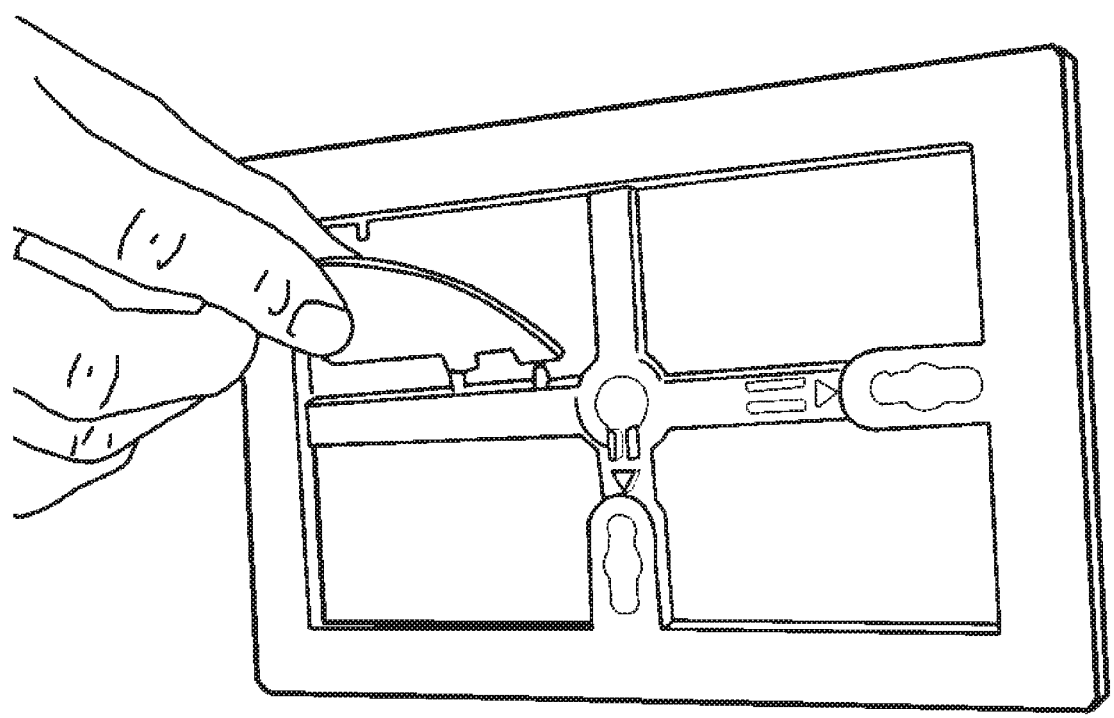
FIG. 8: Detachable tab for support stand.
Figure 9:
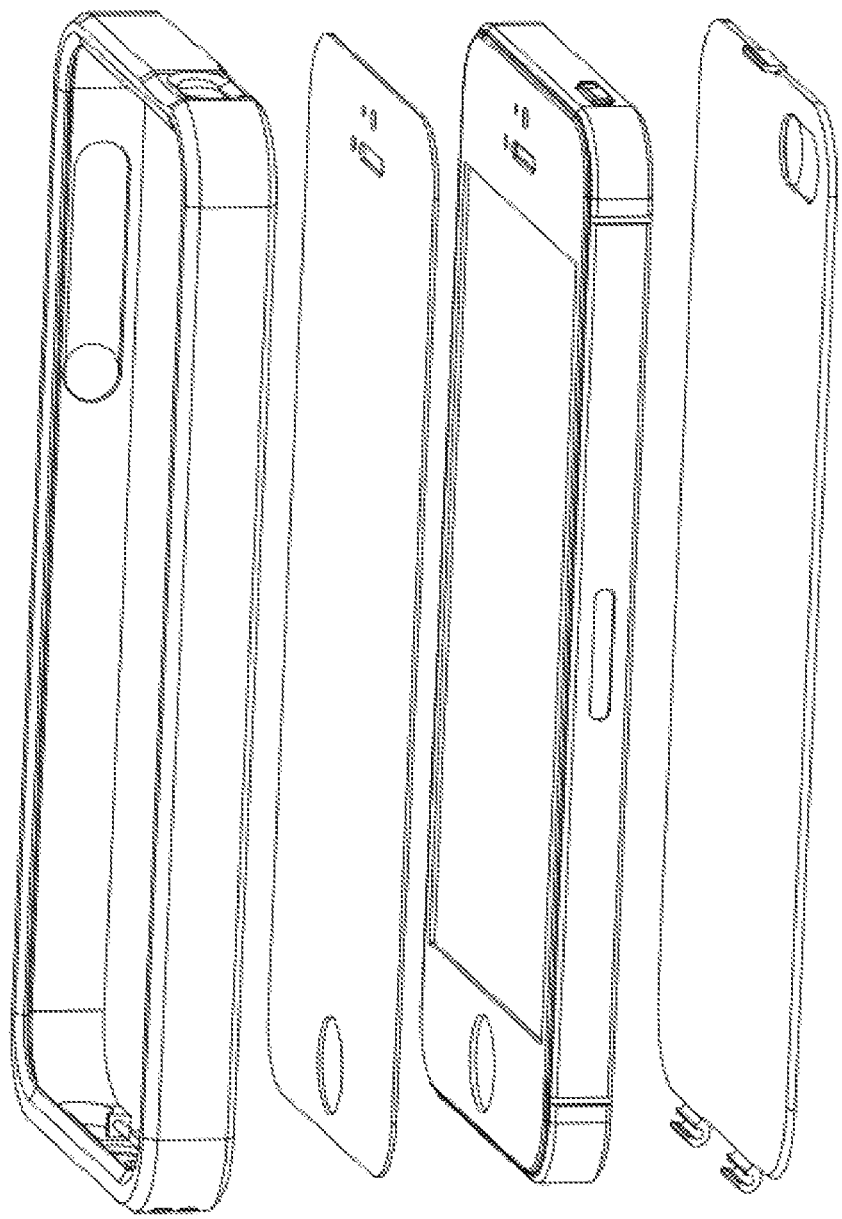
FIG. 9: Case for mobile device that holds lenticular overlay in place.

In a preferred embodiment, lenticular overlay that is smooth on one side with parallel ridges on the other side is snapped into a protective case around the mobile device, as shown in FIG. 8. The preferred embodiment is optical-grade clear plastic such as polyethelyne glycol (PETG) acrylic, polycarbonate or flexible PVC, although that does not preclude other materials. This method adds an inventive step for display screens based on the focusing optics of the array of elongated mini-lenses in parallel on this overlay. In the preferred embodiment, the smooth side of the overlay lies on a digital monitor display, and the ridged side of the overlay faces the person viewing.

In alternate embodiments, other optical overlays can be used with the same stereoscopic effects to lenticular lenses, such as integral, hexagonal, concentric Fresnel or parallax barrier lenses. In other alternate embodiments, the lens can be smooth on the outer surface for use as a touch screen on mobile devices, rather than with the ridges towards the user. However, the ridges must be facing the user in versions of the product where an adhesive 3D screen protector film is used.

The field of view of a lens, or "flip angle", is the viewing area in which you can see through one lens to the pixels underneath, without seeing across to the pixels under the adjoining lens. By knowing the total flip angle, and the number of pixels underneath, we can determine the degrees a single pixel subtends. Knowing also the expected viewing distance and the spacing between the eyes, we can then determine the angle between the eyes from the lens. In stereoscopic viewing with at least one pair of pixels under one micro-lens, the total field of view needs to be the amount subtended by the pairs of pixels underneath. We want to display different pixels in each eye. The effect would not work if both eyes could see the same pixel. In the preferred embodiment, the lens dimensions are designed so that one or more pixels viewable in one eye only subtends half the total field of view of both eyes. With 2 pixels under a lens with a viewing angle of 30 degrees, for example, each pixel subtends 15 degrees.

One inventive step in the snap-in lens disclosed here concerns the much lower resolution available on digital displays than in print. Because standard lenticular sheet has been designed for the print industry, the innovations disclosed here concern a new lens with resolution suitable for relatively low-resolution digital displays. An additional preferred embodiment with these microlenses is therefore that the focal distance is on a plane behind the lenticular sheet.

The innovation disclosed here is to intentionally project the focal plane beyond the lenticular plastic, unlike the print optics. A distance beyond the smooth side of the plastic of 1 mm is the preferred embodiment, although this does not preclude other distances behind the lenticules depending on the exact thickness of display screen substrates. This way, the lenticules focus the viewing on the entire pixels in the screen, not on the back side of the lenticular overlay (as is standard for lenticular printing).

In the preferred embodiment, we also vary the curvature of the lenticules to purposely create a blur patch. Ordinary lenticular plastic is designed to focus as sharply as possible. However, when placed over columns of red, green and blue sub-pixels on a digital display, it causes magnification of a particular column with one of the primary colors, instead of allowing these to mix to create the larger image. With our preferred embodiment in which the lens creates a blur patch over the red, green and blue sub-pixels, we are able to avoid magnifying one of the primary colors. This also gives us the option of maintaining the lenticular ridges in vertical orientation, since they are often tilted to avoid magnifying color columns and creating this artifact. Although the preferred embodiment is to use the ridges vertically for maximum stereoscopic effect, when using lenses that cause red green and blue artifacts on the screen by magnifying sub-pixels, we tilt the lens 20 degrees to avoid these color artifacts. Amounts of tilt other than 20 degrees could also be used, although if too vertical the color artifacts remain, and if too horizontal the left and right eyes both see the same view. Keeping the lenticular ridges vertical facilitates better stereoscopic effects in the horizontal plane.

Given that the 1 mm distance within the substrate of the display screen varies between brands, in the preferred embodiment we generate a blur patch of 80% of the size of the pixel. Then if the distance within the substrate is different and the blur patch becomes larger, it still will not cover additional pixels, causing the eye to see leakage from neighboring pixels.

This was tested in a computer simulation of the light paths, to ensure that the standard problem did not re-occur, magnifying a single color of sub-pixel. Using the simulation, we first verified that using a lens that focused on the pixels (i.e., without the blur patch innovation disclosed here), that it would magnify a single subpixel, and that only a single color would then be seen. But with the blur patch on which the current lens specifications are based, we were then able to verify in the simulation that all three sub-pixels appeared. These would mix together (unless viewing from very close up).

There are two ways to create the blur on the focal plane where the subpixels are. We could focus in front of this plane, so that the plane is out of focus. However, the preferred embodiment is to focus behind the plane, since this causes the light paths and blur patches to land on the sub-pixels more completely. When focusing in front of the focal plane, the light paths continue on and the blur paths tend to go off the side of the pixels.

Calibrating Interlacing for Lenticular Display Screens

In order to create optical effects with the lenticular ridges, methods are also disclosed here for interlacing video on any display screen, and doing so without requiring new software downloads or installation. A grid of parallel lines is used as a mask over one video. The left video plays on top of the grid lines, and the right video is seen in-between the lines (or vice versa). The width of the lines and the spaces in-between is the same. The interlaced strips match the lenses per inch of the lenticular overlay with extreme precision. By using widely available media players and browser plugins that are available with most operating systems such as Flash from Adobe Systems Incorporated, we can enable this functionality without new software being installed.

Our method also allows each user to calibrate the pitch of the interlacing software for the pitch of the pixels on their monitor. Although the movie may be played with its original dimensions or the size made larger or smaller, the grid method disclosed here allows us to adjust the width of the interlaced strips independent of the size of the movie (i.e., video). The process would not work if enlarging the movie changed the size of the strips, so that they were no longer calibrated for the ridges and pitch of the monitor. In the preferred embodiment, we simply change the scale of the grid in small increments to make the strips larger or smaller to match with the monitor pitch.

In another preferred embodiment, our app detects the device size and model, and automatically adjusts the interlacing settings. The app reads the device ID to detect the device model, and adjusts its screen resolution settings accordingly.

An alternate approach for calibration that we also disclose here is to render the left-view movie and the right-view movie, and to interlace them into a single movie at that time before anyone can download or access them for viewing. This ensures that the frames in each movie are exactly matched during playback. Then, to calibrate the strips for different pixel sizes on different brands of monitors, the size of the movie is adjusted in small increments. In the method in the previous paragraph, we purposely separate the movie sizing from the strip sizing. But where it is useful to keep the left and right movies exactly synchronized, and to minimize the bandwidth, an alternate method disclosed here is to use movie size adjustments to adjust the width of the strips. Ordinarily only minute changes are necessary to get the pitch calibrated. If the overall size of the movie needs to be certain pixel dimensions, the movie can also be zoomed in or out slightly, cropping the edges to calibrate for pitch.

If the movie is going to be pre-rendered and the left and right views pre-interlaced before playback in a player such as Flash, a choice then arises for playing the video. The movie player could be set to play the two movies or one interlaced version from a specified directory, usually the same directory. Or, the media player could ask the user to specify a local path or web address for the interlaced movie to play. This allows the interlaced movie to be placed in a common web portal for sharing online video, separate from the player (which could be installed locally, downloadable, or played from a web browser).

Alignment of the underlying strips with the plastic ridges is a difficult procedure in printing. However, in our method for putting a clear ridged overlay on the monitor display, if the alignment is not perfect, the user can move themselves over slightly to get in the sweet spot for viewing, or they can move the plastic over, or they can move the window or player over on the screen. Each of these is much simpler than in printed lenticulars. The pixels are already vertical on a monitor, and the edge of the overlay can be set against the frame of the monitor to ensure that it is the same orientation.

In another preferred embodiment, the orientation of the digital content for the optical overlay can be rotated to align with an incorrectly-installed overlay. In this case, instead of tilting the optical overlay, which is tedious and difficult, we use on-screen rotation icons to adjust the orientation in the software player for viewing video or photos.

With the methods disclosed here, we have also discovered that non-interlaced content can be viewed through a lenticular overlay. Some manufacturers go to great lengths to shut off parallax barriers or lenticular optics using special electronic optical controls. In the methods disclosed here, we can interlace the same movie, image or template or not interlace them, and it still looks as clear through the overlay as interlaced foreground objects. One reason for this is that the background in the left and right movies is the same, and even when interlaced, the strips are hardly visible since the background is the same in both movies. Since the background is clear there, other movies that are not interlaced (or where the same movie is interlaced with itself) are similarly clear.

For stereoscopic viewing, we then play a composite of two movies in thin alternating strips from the left, right, left right and so on. For other effects like look-around, different views can also be added in the interlacing pattern. For example, with a look-around effect and no stereoscopic depth, after calibrating for the monitor pitch as described above, the strips underneath each lens could have a sequence of multiple animation frames: frame 1, frame 2, frame 3 . . . . Or, there could be animation and stereoscopic depth, with patterns such as left frame 1, left frame 2, left frame 3, right frame 1, right frame 2, right frame 3. The number of frames to use in the sequence is only limited by the number of pixels that can fit under the size of lens chosen.

For specific brands of displays, computers and handheld devices with known pixel dimensions, we can simply release a movie interlaced to fit, and do not need to use a program like Flash to calibrate with the monitor pitch. Users can then simply play the movie, and don't need to do calibration at all.

When the calibration is completed and the user is ready to view the movie stereoscopically, it is then possible to enlarge the movie when it first starts to play. A brief zooming in and out enhances the parallax as the motion causes foreground objects to stand out from the background. This is not essential for lenticular playback, but is one way to optimize the depth viewing experience.

Unlimited Sweet Spot with Lenticular Video

With the lenticular lens and the calibration of interlacing described above, a further object of the invention disclosed here is to use an "Unlimited Sweet Spot" feature to remove the flip that is standard with lenticular viewing. As those skilled in the art will know, lenticular optics are designed to show a view to the left eye and a view to the right eye, with this stereopsis creating the perception of depth and pop-out effects. Because users can't be expected to view from exactly the precise position to view one interlaced row of pixels or printed dots, it is common to use more than one pair of rows of pixels or dots behind each lens, if enough resolution is available. Often having 4, 6, 8 or more strips behind each lens means that the user can move back and forth and get a "Look-Around Effect" as if viewing an actual object or hologram.

However, if the user moves beyond the strips under the lens, they start to see on a greater angle to the strips under adjacent lenses, causing a well-known "flip" in the viewing. We therefore change the ordering of the strips to blend the final frames from one zone into the beginning frames of the next zone.

In the preferred embodiment, creating the Unlimited Sweet Spot option, requires that fewer frames are used. You specify half the number of frames you want, and use most of the frames twice in ascending and then descending order, as shown in the pattern below.

The tradeoff in using our Unlimited Sweet Spot feature is that with fewer different views the steps will be larger between each, and the picture will look softer with less resolution. But compared to the annoying flip and ghosting that occurs in the flip between viewing zones, people strongly prefer the viewing experience with no flip.

Here is our current frame ordering, when 24 frames are specified:

1 2 3 4 5 6 7 8 9 10 11 12 13 14 15 16 17 18 19 20 21 22 23 24

The flip occurs because of the jump from the view in the final frame (e.g. from the far right) to the first view (e.g. from the far left). Instead though, we need the beginning and ends to have adjoining frames, like this:

1 3 5 7 9 11 13 15 17 19 21 23 24 22 20 18 16 14 12 10 8 6 4 2

In the preferred embodiment, we then select a lens to use based on whether the Unlimited Sweet Spot is being used. For lenticular overlays with a particular number of lenses per inch, there may be an option of using stronger optical effects with thicker lens, or using thinner lens of the same number of lenses per inch (LPI). In the preferred embodiment, if there is a choice thinner lens is used, which produces less distortion and minimizes background movement in the transition between viewing zones.

Removing the flip from autostereoscopic video (and photos that are printed or displayed on display screens) is an inventive step that produces surprising, unexpected results. Those skilled in the art would say that this is impossible and should not work. But in practice it has a very useful purpose that is preferred by anyone viewing. This is a novel way of removing the annoying flip that characterizes lenticular viewing. Users do not notice any defects, but they prefer the version without the noticeable flip.

Augmented Reality with Pop-Out

In a further preferred embodiment, images or backgrounds from the photo booth or conversion software or 3D player can also be used to add 3D effects to video. This is commonly known as "augmented reality". The 3D effects are typically added to a live video stream, tracking a symbol in the picture to maintain the positioning of the 3D model. The inventive step here is interlacing the 3D parts that are added, so that they can pop out with lenticular viewing. So when the interlaced video player is used, it is possible to create stereoscopic views of 3D objects to create pop-out on a mobile device, but leave the camera's real-time video the same for both eyes. In an alternate embodiment, the camera's real-time video is converted into 3D with positive parallax, and negative parallax is applied to the AR image.

In the preferred embodiment for 3D pop-out with augmented reality, the mobile device's video camera is pointed at an image. Said image could be an ad in a newspaper, magazine or any printed material, a poster ad in a mall or shop window, or even an image on a television, computer or other digital display screen. The software searches for a bar code or particular symbol or object shape. When the software identifies a symbol, bar code, object or photo, it displays a 3D model in a particular orientation and distance, as if the 3D model is part of the scene in view of the camera. The software can store or stream from online either 2D or 3D content, which can be interlaced and displayed as a layer on the video so that the 2D images appear to pop-out because of the lenticular overlay.

This preferred embodiment is beyond existing augmented reality methods because it requires an autostereoscopic 3D device and interlacing player software.

3. 3D Video Player Using Tilt Sensors

There are several industry-standard low-level formats or "graphics engines" for playing 3D on mobile devices such as smart phones and media players, including OpenGL ES and M3G. OpenGL ES is a mobile version of the OpenGL graphics platform on graphics cards for computers. It is the method used for processing 3D graphics such as mobile computer games, in smart phone formats from several of the major manufacturers. M3G is the Mobile 3D Graphics format for running the Java programming language on mobile devices. While these standard formats would be understood by those skilled in the art, we do not restrict the methods disclosed here to any particular graphics format.

In a preferred embodiment, the photorealistic 3D wireframe is displayed on an ordinary display screen (whether connected to a mobile device or on the mobile device itself). In the preferred embodiment, the player app looks for the data in a folder with a filename ending in .2d3d, which is a proprietary format that we developed because 3D graphics engines on mobile devices have tended not to support texture-mapping of video. So in this preferred embodiment, a work-around was developed, to use individual image frames rather than video for the texture-mapping. Frames of the original movie are saved into individual image files, along with data files for wireframe vertices and texture mapping, once the conversion is completed. The video format then involves displaying the individual frames and wireframes in timing matching the audio track. This is an important inventive step.

In the preferred embodiment, the .2d3d folder contains an audio file in .aif format, which defines the length of the movie playback as a 3D experience. Each of the frames from the original video file has been resaved in an image format such as .jpg. For each numbered image, there is a numbered .txt file that defines the wireframe (using the format frame23.txt for frame 23 for example) and a numbered .txt file that defines the texture-mapping of the image onto the wireframe (using the format frameT23.txt for frame 23, for example). An XML file with a standard name that the app can look for such as video_details.plist stores the information to coordinate the play-back, such as the number of frames, the names of the audio and data files, and the format of the images, audio and data files. These conventions are built into the rendering software during the conversion, and then followed in the later playback by a mobile app.

Whether using the red-line method above or automated dual-lens conversions of photos or video, in the preferred embodiment a mobile app looks for the following formatted data to play the video in 3D on ordinary screens, using the tilt sensors in the mobile device to allow the viewpoint to move around the objects in the scene model. There are two data files in our proprietary .2d3d format as noted in the previous paragraph, one for the wireframe and one for the texture-mapping. These data files contain only numbers, although they will be annotated with words here to clarify how they work. At each point in time, depending on the duration of the audio file, the app reads and displays the next set of data and image files. A simple example is used here, of a square on a background, so that there are not too many lines of data.

a.) Frame1.txt for Wireframe

WE HAVE 4 CORNERS ON THE SQUARE, AND IT IS DIVIDED INTO 2 TRIANGLES. FIRST IS THE BACKGROUND, WITH ONE TRIANGLE:
−100 −100 0 0
100 −100 0 0
−100 100 0 0
AND THEN THE OTHER TRIANGLE:
−100 100 0 0
100 −100 0 0
100 100 0 0

THE FOURTH "0" ON THE ABOVE LINES IS THE FLAG FOR TRANSPARENCY, TO INDICATE THAT THIS IS BACKGROUND.
FLAG 0=FOREGROUND OBJECT (NO TRANSPARENCY)
FLAG 1=SIDEWALLS (SEMI-TRANSPARENCY)
FLAG 2=SHADOW HOLE IN BACKGROUND (100% TRANSPARENCY)

THEN COMES THE SQUARE IN THE FOREGROUND IN THIS FRAME. NOTE THAT THE SQUARE IS ACTUALLY SHOWN IN RES1.BMP TWICE, ONCE ON THE BACKGROUND AND ONCE IN THE FOREGROUND. THIS ONE HAS Z=50, SO IS IN THE FOREGROUND. IT HAS FLAG=0, WHICH MEANS 0% TRANSPARENCY.
FIRST TRIANGLE:
−12.89063 −9.375 50 0
−35.15625 −9.375 50 0
−35.54688 12.89063 50 0
AND THEN THE SECOND TRIANGLE FOR THE SQUARE:
−12.89063 −9.375 50 0
−35.54688 12.89063 50 0
−12.5 13.28125 50 0
THE DISTANCE HAS BEEN DEFINED AS Z=50
THE FOLLOWING LINES ENDING IN 1 SHOULD ALL BE SIDEWALLS OF EMBOSSING (AGAIN, IN SETS OF 3 VERTICES FOR TRIANGULAR POLYGONS). FLAG=1 SO THERE SHOULD BE TRANSPARENCY ON THESE:
−71.09375 25.78125 0 1
−35.54688 12.89063 50 1
−70.3125 −18.75 0 1
−70.3125 −18.75 0 1
−35.54688 12.89063 50 1
−35.15625 −9.375 50 1
−25 26.5625 0 1
−12.5 13.28125 50 1
−71.09375 25.78125 0 1
−71.09375 25.78125 0 1
−12.5 13.28125 50 1
−35.54688 12.89063 50 1
−25.78125 −18.75 0 1
−12.89063 −9.375 50 1
−25 26.5625 0 1
−25 26.5625 0 1
−12.89063 −9.375 50 1
−12.5 13.28125 50 1
−70.3125 −18.75 0 1
−35.15625 −9.375 50 1
−25.78125 −18.75 0 1
−25.78125 −18.75 0 1
−35.15625 −9.375 50 1
−12.89063 −9.375 50 1
THEN BELOW IS THE ORIGINAL COPY OF THE SQUARE ON THE BACKGROUND, WITH Z=0 MEANING THIS IS ON THE BACKGROUND (AND FLAG=2).
AGAIN, THIS IS A SQUARE DEFINED AS 2 TRIANGLES:
−25.78125 −18.75 0 2
−70.3125 −18.75 0 2
−71.09375 25.78125 0 2
−25.78125 −18.75 0 2
−71.09375 25.78125 0 2
−25 26.5625 0 2 b.) Format of Data File for Texture-Mapping

THIS IS THE TEXTURE-MAPPING FILE, WHERE STANDARD SCORES ARE USED RANGING FROM 0 TO 1.
  BACKGROUND:
  TRIANGLE ON LEFT:
0 0 0
1 0 0
0 1 0
  TRIANGLE ON RIGHT:
0 1 0
1 0 0
1 1 0
    SQUARE IN FOREGROUND:
    FIRST TRIANGLE:
0.3710938 0.40625 0
0.1484375 0.40625 0
0.1445313 0.6289063 0
    SECOND TRIANGLE:
0.3710938 0.40625 0
0.1445313 0.6289063 0
0.375 0.6328125 0
    SIDEWALLS (24 VERTICES)
0.1445313 0.6289063 0
0.1445313 0.6289063 0
0.1484375 0.40625 0
0.1484375 0.40625 0
0.1445313 0.6289063 0
0.1484375 0.40625 0
0.375 0.6328125 0
0.375 0.6328125 0
0.1445313 0.6289063 0
0.1445313 0.6289063 0
0.375 0.6328125 0
0.1445313 0.6289063 0
0.3710938 0.40625 0
0.3710938 0.40625 0
0.375 0.6328125 0
0.375 0.6328125 0
0.3710938 0.40625 0
0.375 0.6328125 0
0.1484375 0.40625 0
0.1484375 0.40625 0
0.3710938 0.40625 0
0.3710938 0.40625 0
0.1484375 0.40625 0
0.3710938 0.40625 0
THERE IS NO COPY OF THE SQUARE ON BACKGROUND IN THIS TEXTURE-MAPPING

As tilt is detected within the handheld device while the movie or photo is displayed, the viewpoint can be moved in the 3D scene producing a 3D viewing experience. This allows the user to experience the "Look-Around Effect", seeing around foreground objects while video plays on an ordinary display with no 3D optics. An inventive step in this method is that it allows users who do not have access to a 3D overlay or other 3D optics to experience 3D on an ordinary mobile device. Depth perception is produced based on motion parallax, occlusion and look-around capabilities on mobile media players and smart phones, without the need for 3D glasses or lenticular optics.

Several approaches can be used in the 3D playback to get the smoothest performance depending on whether the graphics card supports video texture-mapping or not. The preferred embodiment is to texture-map the movie at a given frame rate onto the moving wireframe. However, if video texture-mapping is not supported, an alternate embodiment is to rapidly copy frames from the movie file in sequence, and texture map each individual frame. Either of these approaches allows us to use an existing movie with the movie player. It can be specified with a local file path or a web address. The only data that then needs to be provided is the XYZ data file defining the wireframe. Finally, another embodiment is also possible if these first two are not supported. In that case, during the pre-rendering phase, as noted above a series of images can be saved with a specified number per second. The folder of these images can then be provided with the sound track and datafile of XYZ coordinates defining the shape and movement of the wireframe.

The movie player on the handheld device has standard VCR-type controls including play, pause and rewind. In the present embodiment, it would also have a progress bar showing how much of the movie is complete and remaining. The main difference from normal movie player programs is that this program does not play flat movies, but is actually displaying a 3D scene, in which the frames are played in sequence.

The movie frames or separate images are texture-mapped onto the depth mesh in the 3D scene. As noted above, the wireframe (also called a depth mesh) has a frame rate which is synchronized with the frame rate for the images. If a foreground object in the video moves across the picture, the wireframe model would therefore change at the same time. Although the images are displayed at a certain rate per second, in the present embodiment the wireframe does not need to be defined for every image frame. To reduce processing resources, the wireframe could use its own keyframes for playback, and move in interpolated steps from a defined position in one frame to its next-defined position in a later frame.

Those skilled in the art will know that texture-mapping is a standard process in which XY coordinates are given defining an image, and these are mapped onto XYZ coordinates on the wireframe. In this way, we drape the original video onto a relief map, not unlike projecting the movie onto a bumpy surface. The elevated parts of the wireframe are foreground areas that were segmented during the keyframing phase.

To maintain the time sequencing, in the present embodiment the audio track is given priority during playback. Those skilled in the art will know that this is a standard procedure for realistic playback of digital video. It is not essential, but is better to drop a frame of video if computer resources are limited, than to let the sound skip. The sound track is of a defined length. When it starts, that cues the frame rates for the images and wireframe movement. As the audio is played, there can be "callbacks" indicating what point the sound track is at. Those can be used to synchronize the frame rates of the images or video, and of the wireframe.

Although segmented objects are pulled closer to the camera on the Z axis, in the preferred embodiment their boundaries are still connected (embossed) with a rounded edge to the background, so that you cannot see behind them to a blank area where they were cut out of the background.

Once the photorealistic 3D scene model exists with the viewpoint in the original real camera perspective, we will then control the camera perspective with tilt sensors or accelerometers, as the mobile device or smart phone is tilted in the hand. Although tilt sensors are used for a variety of applications, the object of the present invention is to enable depth perception in a handheld media player without need for 3D glasses or lenticular optics, simply by moving the viewpoint in the 3D movie as it plays, based on movement of the device. This creates motion parallax and occlusion in the 3D movie, which are depth cues. This could also be described as a "look-around effect", in which you can see around foreground objects in the movie when the device is tilted. The visual experience is like seeing a hologram, but on an ordinary display screen.

As tilt sensors are activated, the viewpoint is moved as if an actual object or diorama was being held in the hand. In the present embodiment, there is a speed sensitivity parameter, to control the rate of movement of the XYZ viewpoint coordinates, based on the rate and amount of tilt of the device.

Although the viewpoint is moved around based on tilt, the view is still centered on the 3D scene model. In the present embodiment, limits can be set and adjusted for the amount the viewpoint can move. Obviously, the handheld media player could be tilted right around backwards until the screen could no longer be seen. That would defeat the purpose. However, it would be possible to have a ratio so that for every degree it is tilted, the viewpoint moves multiple degrees around the digital 3D model, so that you can see farther around foreground objects in the 3D scene without needing to tilt the handheld device so much.

In the present embodiment, there is also an adjustable parameter for whether the viewpoint moves back and forth along the X axis, or whether it rotates around the object. This control could also allow a varying combination of both.

In an alternative embodiment the tilt sensors could be used to navigate through the 3D movie scene as it plays using the tilt sensors, as can be done in computer games. However, most people want a passive viewing experience for watching video such as movies and television. Navigation interrupts their viewing experience, rather than enhancing it. Nevertheless, where 3D navigation or object manipulation is desired with moving through video in a 3D scene model, such as for photorealistic video game production, the methods disclosed here could be useful for moving around in the scene rather than moving it back and forth.

Another alternative embodiment of the methods outlined here would be to use a different type of sensor such as a digital compass or optical flow in image processing to control the viewpoint and display of the 3D movie while it plays. In that case, as the device is moved left or right pointing more north or south for example, the view of the movie scene could move accordingly. The experience would be similar to looking through a camera and swiveling it left or right—except that with the methods outlined here, you would be looking around in a moving photorealistic 3D scene that was initially an ordinary movie.

Although the 3D experience is generated by moving the viewpoint with the tilt sensors in the handheld device, this primarily produces a perception of depth behind the screen. In another embodiment, it is also possible to produce the perception of foreground objects popping out in front of the screen, by adding lenticular overlays to combine both approaches.

The invention may be embodied in other specific forms without departing from the spirit or essential characteristics thereof The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed is:

1. A fully-automated 3D photo booth comprising:
    a) a machine that takes pictures or video with single- or dual-lens cameras;
    b) software for running on a computer processor to cause the processor to convert the digital imaging to a 3D model, and provide the option to integrate it into themed foregrounds and backgrounds;
    c) a lenticular display monitor that previews the 3D results with or without a preselected template;
    d) a dispenser for storing and releasing an interlaced photo and 3D photo frame; and
    e) an option to receive digital content instead of a lenticular print, with the resulting 3D content transmitted to the user's mobile device, or sent online via email or social network, wherein a snap-in 3D photo frame can be dispensed from the machine, providing the advantage of simply setting the interlaced photo into the frame and snapping a lenticular overlay in on top to hold the photo paper tightly to a plastic across the image, with no need for adhesive, a laminating machine or additional production time.

2. The fully-automated 3D photo booth defined in claim 1, wherein the conversion, alignment and printing is designed to be so automated and fast that it can be provided to the customer on the spot, with no labor time needed for manual 3D rendering or laminating.

3. The fully-automated 3D photo booth defined in claim 1, wherein the machine can be a booth or a free-standing portable version, which can be operated by a retailer or have a coin-operated dispenser of prints and/or snap-on lenticular frames.

4. The fully-automated 3D photo booth defined in claim 1, wherein the display in the photo is pre-arranged to facilitate 3D conversion by internal software which separates anyone in the foreground from the background using depth keying based on blue- or green-screen, greyscale, or visual field height.

5. The fully-automated 3D photo booth defined in claim 1, wherein dual-lens imaging is converted automatically to a 3D wireframe model by software algorithms that quickly look for the best matches between the left and right images to find coarse segments of foreground objects and assign depth using binocular disparity, before then using multi-color searching from the inside and outside of the object boundary at the same time for high-quality edge detection.

6. The fully-automated 3D photo booth defined in claim 1, wherein single-lens video can also be provided later to customers after pre-processing the video manually using dynamic keyframing to track the movement of objects by marking a dot on the same feature in subsequent keyframes and manually specifying its depth, with programming code interpolating the movement between keyframes based on the number of frames in-between, and moving the XYZ coordinates of a dot in equal increments to match up from the earlier to the later keyframe.

7. The fully-automated 3D photo booth defined in claim 1, wherein the 3D wireframe is made photorealistic by joining the vertices in XYZ coordinates into polygons and texture-mapping the XY coordinates for specific points in the image onto the corresponding XYZ points in the 3D wireframe.

8. The fully-automated 3D photo booth defined in claim 1, wherein the edges of foreground objects can be embossed to give thickness to the object, or can remain attached to the background so that no hole is visible if the viewpoint can see around behind the foreground object.

9. The fully-automated 3D photo booth defined in claim 1, wherein the automated dual-lens video conversion allows real-time 3D video where themes and objects can optionally be set into or removed from various depths in the scene, and the resulting 3D scene can be viewed in 3D for video conferencing or other broadcasts of stereoscopic live or taped video.

10. The fully-automated 3D photo booth defined in claim 1, wherein the 3D print or digital (photo or video) output can be viewed without 3D glasses, using either a lenticular overlay or the tilt sensors on a mobile device to provide the perception of 3D.

11. The fully-automated 3D photo booth defined in claim 1, wherein a snap-in 3D photo frame contains slots for wall hanging, a removable tab that can stand the frame up and optional back-lighting.

12. The fully-automated 3D photo booth defined in claim 1, wherein a lenticular overlay can be provided that quickly and easily snaps in to a protective case for a mobile device at the precise alignment for the interlacing on screen, to allow stereoscopic popout and lenticular effects from digital content instead of print.

13. The fully-automated 3D photo booth defined in claim 1, wherein the lens focal distance is purposely beyond the back edge of the lenticule as is the standard for print lenticulars, and focused beyond the sub-pixels so that the red green and blue sub-pixels are blurred into a single color, to eliminate Moiré artifacts and allow vertical lenses to be used for maximum stereoscopic effects.

14. The fully-automated 3D photo booth defined in claim 1, wherein digital photos or digital video can be played with a lenticular screen overlay to create stereoscopic depth and pop-out by playing multiple interlaced views of the 3D scene model in an app or in a video player like Flash that does not require a separate download, with adjustment of the movie size for different screen sizes not affecting the width of the interlacing, to maintain the calibration.

15. The fully-automated 3D photo booth defined in claim 1, wherein the orientation of the digital content for the optical overlay can be rotated to align with an incorrectly-installed overlay using on-screen rotation icons to adjust the orientation in the software player for viewing video or photos.

16. The fully-automated 3D photo booth defined in claim 1, wherein the frames can be re-ordered for lenticular interlacing to create an Unlimited Sweet Spot, by blending the final frames from one zone into the beginning frames of the next zone by using fewer frames and using some or all of the frames twice in ascending and then descending order so that the first and last frames adjoin instead of starting over.

17. The fully-automated 3D photo booth defined in claim 1, wherein the 3D conversion can be viewed on an ordinary mobile device with no lenticular overlay or 3D glasses, using the tilt sensors in the device to move the viewpoint as the orientation changes in the device, allowing the user to look around foreground objects the same as if an object was being tilted in different directions, but both with photos or while video plays.

18. The fully-automated 3D photo booth defined in claim 1, wherein a 3D model can be overlaid on a live video stream from a mobile device, and moved with the scene in view by using the tilt sensors in the mobile device or by tracking a symbol or bar code in the scene, improving the standard Augmented Reality experience by interlacing the 3D model or entire scene to create novel stereoscopic depth perception.

19. The fully-automated 3D photo booth defined in claim 1, wherein the 3D output can be viewed by the user locally, or can also be sent to others by email or social media for viewing using a lenticular overlay if available or with tilt-sensor viewpoint control on ordinary display screens.

20. The fully-automated 3D photo booth defined in claim 1, wherein the software ("app") for the mobile device can recognize whether the device has an overlay or not, to determine the type of content to display, through a method comprising the following steps:
   a) the app is a free download;
   b) when the app is activated, it will prompt the user to enter the serial number of their screen protector, but will work as a 2D video player if no number is provided;
   c) each optical screen is sold with a unique serial number that can only be used once and is stored on a server;
   d) the app searches the user's contact list to identify other users of the same app, so that when sharing photos and or video between devices the sending device will know who on the contact list has the same app; and
   e) the shared 3D content, photos and video is then sent by the app in a format for optical viewing with the screen protector if a registered user, or with the tilt sensors for contacts with no optical overlay.

* * * * *